(No Model.)

L. HULIN.
MANUFACTURE OF CARBON BLOCKS.

No. 473,841.                     Patented Apr. 26, 1892.

WITNESSES:
Francis Crouch
Claire M Puffer

INVENTOR:
Léon Hulin
by G. P. Lowrey
ATTY.

THE NORRIS PETERS CO., PHOTO-LITHO., WASHINGTON, D. C.

UNITED STATES PATENT OFFICE.

LÉON HULIN, OF FROGES, FRANCE, ASSIGNOR TO GROSVENOR P. LOWREY, OF NEW YORK, N. Y.

MANUFACTURE OF CARBON BLOCKS.

SPECIFICATION forming part of Letters Patent No. 473,841, dated April 26, 1892.

Application filed April 23, 1890. Serial No. 349,193. (No model.) Patented in France November 7, 1889, No. 201,784.

*To all whom it may concern:*

Be it known that I, LÉON HULIN, a citizen of the Republic of France, residing at Froges, Department of Isere, France, have invented a new and useful Improvement in the Process for the Manufacture of Carbon Blocks, (for which I have obtained Letters Patent of the Republic of France, No. 201,784, dated November 7, 1889,) of which the following is a specification.

My invention relates to a new process for manufacturing "blocks of carbon," and by this term I mean articles of any desired size and configuration, which process has been found to do away with many of the difficulties attendant upon the use of the masses of carbon of any considerable size when made by the methods commonly employed.

Inasmuch as the making of electrodes for use in electro-metallurgical and electro-chemical operations is the field for which my invention was primarily devised and in which it will be most likely to be put into immediate commercial use, the following specification treats more particularly of this specific application of my invention, though I desire it to be understood that the invention is in no way limited to the making of electrodes alone; but, on the contrary, may be availed of in the manufacture of carbon conductors, crucibles, molds, or other articles, all of which are intended to be covered by my claims.

The general nature of my invention may be outlined by observing that I prepare separately a number of plates or laminæ of carbonaceous material, from which I build up the desired block, putting an intermediate coating of agglomerating material between the plates, and finally I bake the built-up block in any suitable form of furnace.

My invention is illustrated in the accompanying drawings, wherein—

Figure 1:
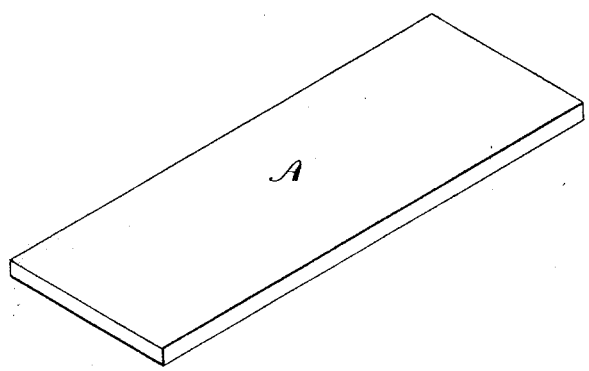
Figure 2:
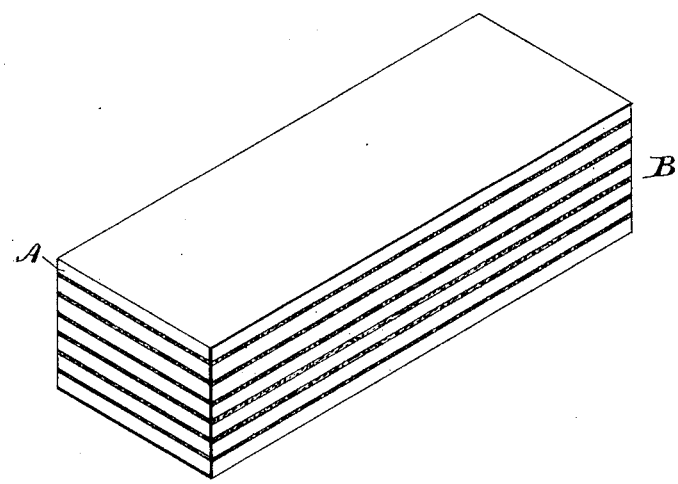

Figure 1 is a perspective view of a single one of the plates or laminæ, and Fig. 2 is a similar view showing a completed electrode.

I first take pieces of retort-carbon or petroleum-coke or any other preferred form of carbon and I pulverize them in a crusher. The pulverized carbon is then passed through a grinder and the dust is dried and mixed thoroughly with gas-tar automatically sprinkled over the carbon in definite proportions, by weight. The paste is then molded and rolled into plates, which are trimmed to the required shape and dimension and then dried by exposure to the open air and subsequently in a heated chamber. These various steps are all well known in the art of carbon-making as now practiced, and I refer to them not as a part of my invention, but simply to illustrate a suitable way in which to prepare the carbon plates or laminæ with which my invention deals. These plates will of course be made of various shapes and sizes, according to the configuration of the article which it is desired to form, and one of them suitable for an electrode is illustrated at A, Fig. 1. The plates A have the same superficial dimensions as the desired electrode. They are taken from the drying-chamber when they have become stiff and fragile, but not sonorous, and are then coated with a thick layer of the agglomerating substance, generally consisting of a composition of seventy per cent. hot tar and thirty per cent. carbon dust, the application of this composition being made to one side or surface only of said carbon plates. The plates thus coated are then fitted upon one another and accurately adjusted, so as to form an electrode B, Fig. 2, of the required shape. When thus joined together, the electrode or other built-up carbon block is inserted into a cast-iron crucible, which is then put into a furnace, in which the temperature is gradually raised for about eighteen hours, when it is allowed to cool gradually, the maximum heat of the furnace being about a bright red heat of iron. The carbon produced in this way is specially adapted to withstand exposure to an extreme heat, such as is found in the electric furnaces used for smelting aluminous and other ores. When carbon blocks as ordinarily made are used for the electrodes in such furnaces, they break or shatter and pieces fall to the bottom of the crucible, producing short circuits, which can only be interrupted by stopping the dynamo or otherwise breaking the circuit, and thereby stopping the operation of reduction in order to pick out the broken pieces of carbon. This result is chiefly due to the fact that when a large piece of carbon is exposed to the high heat of the furnace there will be such a difference of temperature between the center and outside portions of the mass as will produce very unequal expansion therein, so that as the elasticity of the carbon is small and its expansibility under heat considerable it has been found that large blocks of carbon made solid are not well adapted to resist intense heat. Carbon blocks or electrodes, however, made by my present invention have the same liberty of expansion as when the electrode is formed of a number of plates mechanically bound together and at the same time have not the effect of non-homogeneity, which very often produces electric arcs between the plates, bad contacts, and resistances, all of which tend not only to weaken the current, but also to make the plate break. Furthermore, it is found that a very considerable and important economy results from the use of carbon electrodes constructed as above indicated in all electro-metallurgical processes conducted on a commercial scale, principally owing to the fact that said blocks of carbon conduct the current perfectly well without any noticeable heating of any part of the mass, thereby indicating a materially less resistance than in any mass of carbon of equal size constructed in any other method of which I am aware.

I claim as my invention—

1. The herein-described process of making articles of carbon, which consists in shaping and preparing ready for baking separately a number of comparatively small plates or blocks of carbon, building up the desired article from such plates while still unbaked, and then baking the article thus formed, as described.

2. The herein-described process for forming a carbon electrode, which consists in shaping from carbon paste and preparing ready for baking separately a number of plates or blocks of carbon of comparatively small size, fitting such plates together with a suitable agglomerating material to form an electrode of the desired dimensions, and baking the electrode thus formed, as set forth.

3. A carbon conductor consisting of a number of separately-prepared carbon plates or slabs fitted together and baked, substantially as described.

LÉON HULIN.

In presence of—
OSCAR MALMROS,
HASTINGS BURROUGHS.